US007605861B2

(12) United States Patent
LaSalle et al.

(10) Patent No.: US 7,605,861 B2
(45) Date of Patent: *Oct. 20, 2009

(54) APPARATUS AND METHOD FOR PERFORMING MOTION CAPTURE USING SHUTTER SYNCHRONIZATION

(75) Inventors: Greg LaSalle, San Francisco, CA (US); Roger Van der Laan, Los Altos, CA (US); Stephen G. Periman, Palo Alto, CA (US); John Speck, Sunnyvale, CA (US); Timothy S. Cotter, Sunnyvale, CA (US); Kenneth A. Pearce, San Francisco, CA (US)

(73) Assignee: OnLive, Inc., Palo Alto, CA (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/077,628

(22) Filed: Mar. 10, 2005

(65) Prior Publication Data

US 2006/0203096 A1 Sep. 14, 2006

(51) Int. Cl.
*H04N 5/222* (2006.01)
*H04N 9/04* (2006.01)
*H04N 5/228* (2006.01)
*H04N 5/225* (2006.01)
*H04N 5/262* (2006.01)

(52) U.S. Cl. .................. 348/371; 348/208.14; 348/370; 348/207.99; 348/218.1; 348/239

(58) Field of Classification Search ......... 348/169–172, 348/218.1, 208.14, 162, 207.99, 239, 370–371
See application file for complete search history.

(56) References Cited

U.S. PATENT DOCUMENTS 3,699,856 A 10/1972 Chabot et al.
4,389,670 A * 6/1983 Davidson et al. ............ 348/162
4,417,791 A 11/1983 Erland et al.
5,235,416 A * 8/1993 Stanhope ..................... 348/77
5,304,809 A * 4/1994 Wickersheim ........... 250/458.1
5,480,341 A 1/1996 Plakos
5,519,826 A 5/1996 Harper et al.
5,569,317 A * 10/1996 Sarada et al. ............... 524/111

(Continued)

FOREIGN PATENT DOCUMENTS

WO WO 99/55220 11/1999
WO WO-9955220 11/1999

OTHER PUBLICATIONS

Guenter et al., "Making Faces", International Conference on Computer Graphics and Interactive Techniques, Proceedings of the 25th annual conference on Computer graphics and interactive techniques, pp. 55-66, 1998.*
Radovan et al., "Facial animation in a nutshell: past, present and future", Proceedings of the 2006 annual research conference of the South African institute of computer scientists and information technologists on IT research in developing couuntries, p. 71-79, Oct. 9-11, 2006, Somerset West, South Africa.*

(Continued)

*Primary Examiner*—David L Ometz
*Assistant Examiner*—Richard M Bemben
(74) *Attorney, Agent, or Firm*—Blakely, Sokoloff, Taylor & Zafman LLP

(57) ABSTRACT

A method is described comprising: applying phosphorescent paint to specified regions of a performer's face and/or body; strobing a light source on and off, the light source charging the phosphorescent paint when on; and strobing the shutters of a first plurality of cameras synchronously with the strobing of the light source to capture images of the phosphorescent paint, wherein the shutters are open when the light source is off and the shutters are closed when the light source is open.

52 Claims, 11 Drawing Sheets

U.S. PATENT DOCUMENTS

| | | | |
|---|---|---|---|
| 5,852,672 | A | 12/1998 | Lu |
| 5,966,129 | A | 10/1999 | Matsukuma et al. |
| 6,020,892 | A * | 2/2000 | Dillon .................... 345/419 |
| 6,151,118 | A | 11/2000 | Norita et al. |
| 6,243,198 | B1 | 6/2001 | Sedlmayr |
| 6,473,717 | B1 | 10/2002 | Claussen et al. |
| 6,513,921 | B1 * | 2/2003 | Houle ...................... 347/96 |
| 6,554,706 | B2 | 4/2003 | Kim et al. |
| 6,592,465 | B2 * | 7/2003 | Lutz et al. ................ 473/198 |
| 6,633,294 | B1 * | 10/2003 | Rosenthal et al. ......... 345/474 |
| 6,850,872 | B1 | 2/2005 | Marschner et al. |
| 6,943,949 | B2 | 9/2005 | Sedlmayr |
| 7,068,277 | B2 * | 6/2006 | Menache .................. 345/473 |
| 7,081,997 | B2 | 7/2006 | Sedlmayr |
| 7,154,671 | B2 | 12/2006 | Sedlmayr |
| 7,184,047 | B1 * | 2/2007 | Crampton ................ 345/473 |
| 7,218,320 | B2 * | 5/2007 | Gordon et al. ............ 345/475 |
| 7,333,113 | B2 * | 2/2008 | Gordon ................... 345/475 |
| 7,358,972 | B2 * | 4/2008 | Gordon et al. ............ 345/473 |
| 7,369,681 | B2 * | 5/2008 | Foth et al. ................. 382/103 |
| 2003/0095186 | A1 * | 5/2003 | Aman et al. .............. 348/162 |
| 2006/0061680 | A1 * | 3/2006 | Madhavan et al. ........ 348/370 |
| 2006/0192785 | A1 * | 8/2006 | Marschner et al. ........ 345/473 |
| 2007/0024946 | A1 | 2/2007 | Panasyuk et al. |
| 2008/0100622 | A1 * | 5/2008 | Gordon .................... 345/427 |

OTHER PUBLICATIONS

Chuang and Bregler, Performance driven facial animation using blendshape interpolation, Computer Science Department, Stanford University.*

Wang et al., "Assembling an expressive facial animation system", ACM Siggraph Video Game Symposium, Proceedings of the 2007 ACM Siggraph symposium on Video games, pp. 21-26, 2007.*

Graham, M., "The Power of Texture: A New Approach for Surface Capture of the Human Hand," Apr. 30, 2004, Carnegie Mellon University Computer Science Department, pp. 1-23.

Guskov, I., et al., "Trackable Surfaces," Jul. 2003, Siggraph 2003, pp. 251-257, 379.

Parke, F., "Computer Generated Animation of Faces," 1972, Siggraph 1972, pp. 451-457.

Scott, R., Sparking Life Notes on the Performance Capture Sessions for The Lord of the Rings: The Two Towers, Nov. 2003, ACM Siggraph vol. 37, No. 4, pp. 17-21.

Vicon, Vicon Motion Picture Ltd., 2 pgs, printed Feb. 25, 2005, www.vicon.com/jsp/index.jsp.

Vicon-Products, Vicon MX: System Overview, 2 pgs., printed Feb. 25, 2005, www.vicon.com/jsp/products/product-overview.jsp.

Vicon-Products, MX System: Cameras, "The Most Powerful, Practical and Versatile Range of Motion Capture Cameras," 1 pg., printed Feb. 25, 2005, www.vicon.com/jsp/products/product-category.jsp?cat=cameras.

Vicon, Vicon Motion Systems // MX3, MX3 Camera, The MX3 0.3 Million-pixel Motion Capture Camera, 2 pgs., printed on Feb. 25, 2005, www. vicon.com/jsp/products/product-detail.jsp?id=173.

Vicon, Vicon Motion Systems // MX13, MX13 Camera, The MX13 1.3 Million-pixel Motion Capture Camera, 2 pgs., printed on Feb. 25, 2005, www.vicon.com/jsp/products/prdouct-detail.jsp?id=170.

Vicon, Vicon Motion Systems // MX40, MX40 Camera, The MX40 4 Million-pixel Motion Capture Camera, 2 pgs., printed on Feb. 25, 2005, www.vicon.com/jsp/products/product-detail.jsp?id=167.

Vicon, Vicon motion Systems // SV Cam, 1 pg., printed on Feb. 25, 2005, www.vicon.com/jsp/products/product-detail.jsp?id+189.

Motion Analysis Corporation, The Motion Capture Leader, 1 pg., printed on Feb. 25, 2005, www.motionanalysis.com/.

MotionAnalysis, Video Game Products, Products, 1 pg., printed Feb. 25, 2005, www.motionanaylsis.com/applications/animation/games/produtcs.html.

MotionAnalysis, Eagle Digital System, 4 pgs., printed on Feb. 25, 2005, www.motionanalysis.com/applications/animation/games/eaglesystem.html.

MotionAnalysis, Hawk Digital System, 4 pgs., printed on Feb. 25, 2005, www.motionanalysis.com/applications/animation/games/hawksystem.html.

MotionAnalysis, Falcon Analog System, 4 pgs., printed on Feb. 25, 2005, www.motionanaylsis.com/applications/animation/games/falconsystem.html.

Office Action from U.S. Appl. No. 11/077,628, mailed Feb. 13, 2009, 24 pgs.

Office Action from U.S. Appl. No. 11/255,854, mailed Feb. 23, 2009, 14 pgs.

Bourke, P. , "Cross Correlation", "Cross Correlation", Auto Correlation—2D Pattern Identification, Aug. 1996, printed on Oct. 29, 2005, http://astonomy.swin.edu.au/~pbourke/other/correlat/.

Chuang, & Bregler, et al., "Performance Driven Facial Animation using Blendshape Interpolation", Computer Science Department, Stanford University, (Apr. 2002), 8 pages.

Graham, M Ian, "The Power of Texture: A New Approach for Surface Capture of the Human Hand", Carnegie Mellon University Computer Science Department, (Apr. 30, 2004), pp. 1-23.

Guenter, Brian, et al., "Making Faces", "Making Faces", International Conference on Computer Graphics and Interactive Techniques, Proceedings of the 25th annual conference on computer graphics and interactive techniques, pp. 55-66, 1998.

Guskov, "Direct Pattern Tracking On Flexible Geometry", 6 pages, Winter School of Computer Graphics, 2002, University of Michigan, (2002).

Guskov, Igor, et al., "Trackable Surfaces", Eurographics/Siggraph Symposium on Computer Animation, (Jul. 2003), pp. 251-257 and 379.

Motionanalysis, "Hawk Digital System", www.motionanalysis.com/applications/animation/games/hawksytem.html, 4 pgs., printed on Feb. 25, 2005, 4 pages.

Motionanalysis, "The Motion Capture Leader, The Undisputed Leader for 3D Optical Motion Capture System", www.motionanaylsis.com/, (Jan. 27, 2005), 1 page.

Motionanalysis, "Eagle Digital System", www.motionanalysis.com/applications/animation/games/eaglesystem.html, 4 pgs. printed on Feb. 25, 2005, 4 pages.

Motionanalysis, "Falcon Analog System", www.motionanaylsis.com/applications/animation/games/falconsystem.html, 4 pgs., printed on Feb. 25, 2005, 4 pages.

Motionanalysis, "Video Game Products, Products", www.motionanaylsis.com/applications/animation/games/produtcs.html, printed Feb. 25, 2005, 1 page.

Parke, Frederick I., "Computer Generated Animating of Faces", Siggraph 1972, pp. 451-457.

Radovan, Mauricio , et al., "Facial Animation in a Nutshell: Past, Present and Future", Proceedings of the 2006 annual research conference of the South African institute of computer scientists and information technologists on IT research in developing countries, pp. 71-79, (2006).

Scott, Remington, "Sparking Life Notes on the Performance Capture Sessions for The Lord of the Rings: The Two Towers", ACM Siggraph, vol. 37, No. 4, (Nov. 2003), 17-21 pages.

Vicon, "Vicon Motion Systems // MX13, MX13 Camera, The MX13 1.3 Million-pixel Motion Capture Camera", www.vicon.com/jsp/products/prdouct-detail.jsp?id=170, (Feb. 25, 2005), 2 pages.

Vicon, "Vicon Motion Systems // MX3, MX3 Camera, The MX3 0.3 Million-pixel Motion Capture Camera", www.vicon.com/jsp/products/product-detail.jsp?id=173, (Feb. 25, 2005), 2 pages.

Vicon, "Vicon Motion Systems // MX40, MX40 Camera, The MX40 4 Million-pixel Motion Capture Camera", www.vicon.com/jsp/products/product-detail.jsp?id=167, 2 pgs. printed on Feb. 25, 2005, 2 page.

Vicon, "Vicon motion Systems // SV Cam", www.vicon.com/jsp/products/product-detail.jsp?id+189, (Feb. 25, 2005), 1 page.

Vicon, "Vicon Systems Ltd.", www.vicon.com/jsp/index.jsp, cited as Vicon Motion Picture Ltd. but that was named incorrectly. Correct title is Vicon Systems Ltd. (Feb. 25, 2005), 2 pages.

Vicon-Products, "MX System: Cameras, The Most Powerful, Practical and Versatile Range of Motion Capture Cameras", www.vicon.com/jsp/products/product-category.jsp?cat=cameras, (Feb. 25, 2006), 1 page.

Vicon-Products, "Vicon MX: System Overview", www.vicon.com/jsp/products/product-overview.jsp, (Feb. 25, 2005), 2.

Wang, Alice, et al., "Assembling an Expressive Facial Animation System", ACM Siggraph Video Game Symposium, Proceedings of the 2007 ACM Siggraph symposium on Video games, pp. 21-26, 2007.

Zhang, "Spacetime Faces: High Resolution Capture for Modeling and Animation", 11 pages, ACM Transactions on Graphics, 2004, University of Washington.

Examination Report from counterpart New Zealand Patent Application No. 553106, mailed Jun. 22, 2009, 2 pgs.

* cited by examiner

APPARATUS AND METHOD FOR PERFORMING MOTION CAPTURE USING SHUTTER SYNCHRONIZATION

BACKGROUND OF THE INVENTION

1. Field of the Invention

This invention relates generally to the field of motion capture. More particularly, the invention relates to an improved apparatus and method for performing motion capture using shutter synchronization and/or using phosphorescent paint.

2. Description of the Related Art

"Motion capture" refers generally to the tracking and recording of human and animal motion. Motion capture systems are used for a variety of applications including, for example, video games and computer-generated movies. In a typical motion capture session, the motion of a "performer" is captured and translated to a computer-generated character.

As illustrated in FIG. 1 in a motion capture system, a plurality of motion tracking "markers" (e.g., markers 101, 102) are attached at various points on a performer's 100's body. The points are selected based on the known limitations of the human skeleton. Different types of motion capture markers are used for different motion capture systems. For example, in a "magnetic" motion capture system, the motion markers attached to the performer are active coils which generate measurable disruptions x, y, z and yaw, pitch, roll in a magnetic field.

By contrast, in an optical motion capture system, such as that illustrated in FIG. 1, the markers 101, 102 are passive spheres comprised of retro-reflective material, i.e., a material which reflects light back in the direction from which it came, ideally over a wide range of angles of incidence. A plurality of cameras 120, 121, 122, each with a ring of LEDs 130, 131, 132 around its lens, are positioned to capture the LED light reflected back from the retro-reflective markers 101, 102 and other markers on the performer. Ideally, the retro-reflected LED light is much brighter than any other light source in the room. Typically, a thresholding function is applied by the cameras 120, 121, 122 to reject all light below a specified level of brightness which, ideally, isolates the light reflected off of the reflective markers from any other light in the room and the cameras 120, 121, 122 only capture the light from the markers 101, 102 and other markers on the performer.

A motion tracking unit 150 coupled to the cameras is programmed with the relative position of each of the markers 101, 102 and/or the known limitations of the performer's body. Using this information and the visual data provided from the cameras 120-122, the motion tracking unit 150 generates artificial motion data representing the movement of the performer during the motion capture session.

A graphics processing unit 152 renders an animated representation of the performer on a computer display 160 (or similar display device) using the motion data. For example, the graphics processing unit 152 may apply the captured motion of the performer to different animated characters and/or to include the animated characters in different computer-generated scenes. In one implementation, the motion tracking unit 150 and the graphics processing unit 152 are programmable cards coupled to the bus of a computer (e.g., such as the PCI and AGP buses found in many personal computers). One well known company which produces motion capture systems is Motion Analysis Corporation (see, e.g., www.motionanalysis.com).

SUMMARY

A method is described comprising: applying phosphorescent paint to specified regions of a performer's face and/or body; strobing a light source on and off, the light source charging the phosphorescent paint when on; and strobing the shutters of a first plurality of cameras synchronously with the strobing of the light source to capture images of the phosphorescent paint, wherein the shutters are open when the light source is off and the shutters are closed when the light source is open.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

Described below is an improved apparatus and method for performing motion capture using shutter synchronization and/or phosphorescent paint. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

The assignee of the present application previously developed a system for performing color-coded motion capture and a system for performing motion capture using a series of reflective curves painted on a performer's face. These systems are described in the co-pending applications entitled "APPARATUS AND METHOD FOR CAPTURING THE MOTION AND/OR EXPRESSION OF A PERFORMER," Ser. No. 10/942,609, and Ser. No. 10/942,413, Filed Sep. 15, 2004. These applications are assigned to the assignee of the present application and are incorporated herein by reference.

Figure 1:
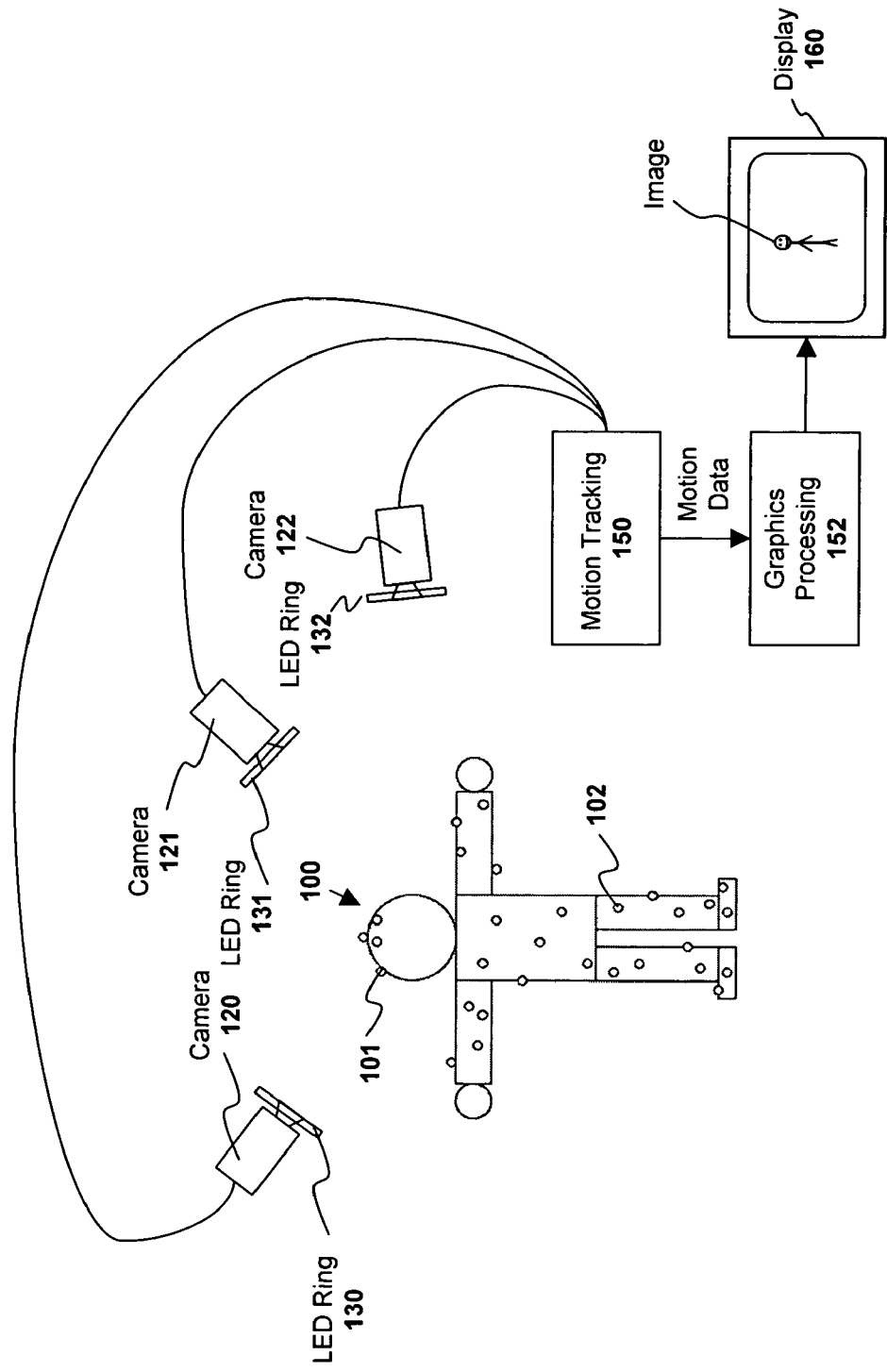
FIG. 1 illustrates a prior art motion tracking system for tracking the motion of a performer using retro-reflective markers and cameras.
Figure 2:
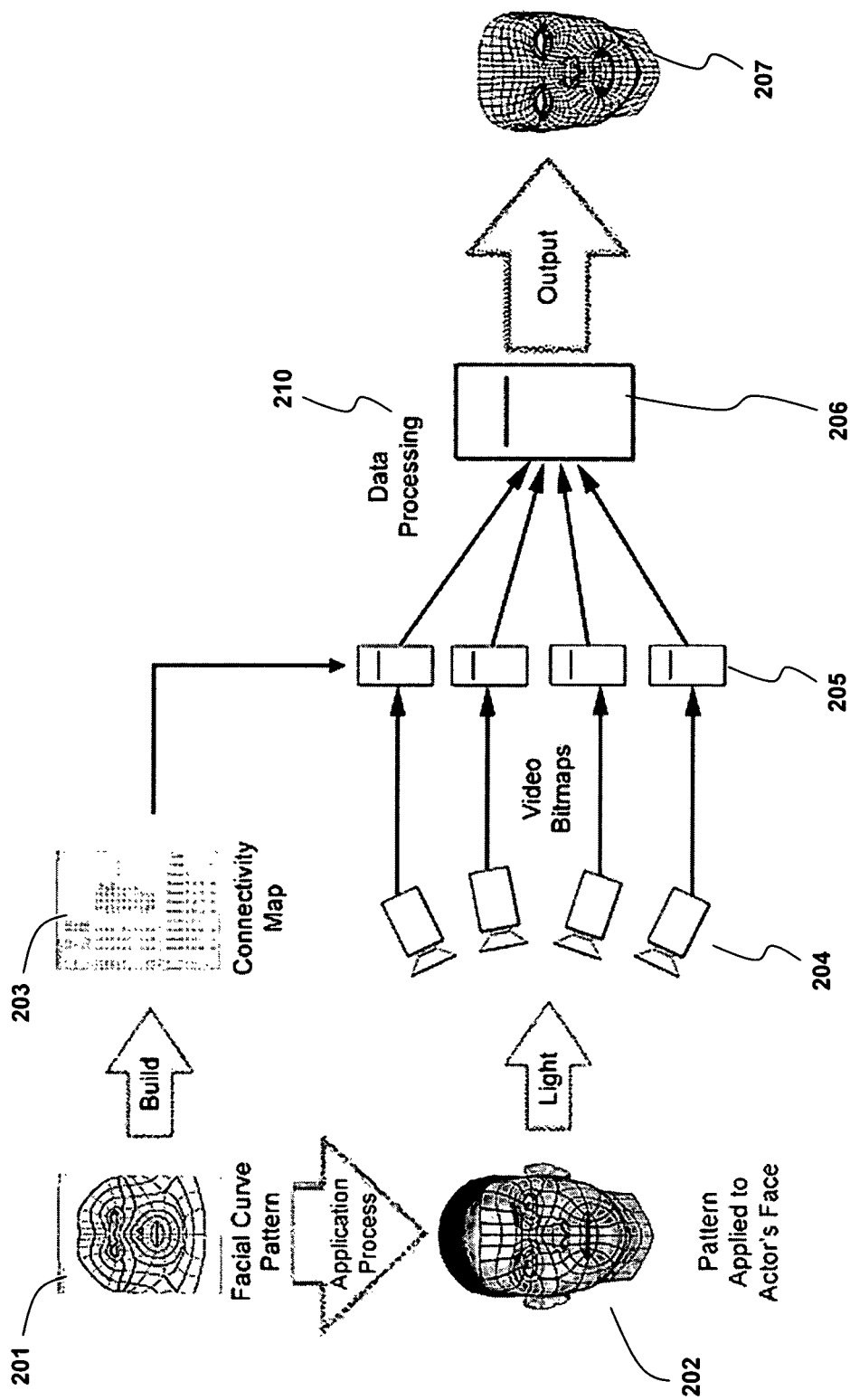
FIG. 2 illustrates one embodiment of the invention which employs a curve pattern to track facial expression.

As described in these co-pending applications, by analyzing curves rather than discrete data points on a performer's face, the motion capture system is able to generate significantly more surface data than traditional marker-based tracking systems. FIG. 2 illustrates an exemplary motion capture system described in the co-pending applications in which a predefined facial curve pattern 201 is adjusted to fit the topology of each performer's face 202. In one embodiment, the three-dimensional (3-D) curve pattern is adjusted based on a 3-D map of the topology of the performer's face captured using a 3-D scanning system.

The curves defined by the curve pattern 201 are painted on the face of the performer using retro-reflective, non-toxic paint or theatrical makeup. As described in detail below, in one embodiment of the invention, non-toxic phosphorescent paint is used to create the curves.

As described in the co-pending applications, each curve painted on the performer's face has a unique identifying name and/or number (to support systematic data processing) and potentially a color that can be easily identified by the optical capture system. Once the curve pattern is applied, in one embodiment, the curve pattern is tracked by a motion capture processing system 210 comprised of one or more camera controllers 205 and a central motion capture controller 206 during the course of a performance. In one embodiment, each of the camera controllers 205 and central motion capture controller 206 is implemented using a separate computer system. Alternatively, the cameral controllers and motion capture controller may be implemented as software executed on a single computer system or as any combination of hardware and software.

In one embodiment, each of the camera controllers 205 and/or the motion capture controller 206 is programmed with data 203 representing the curve pattern 201. The motion capture system 210 uses this information to trace the movement of each curve within the curve pattern during a performance. For example, the performer's facial expressions provided by each of the cameras 204 (e.g., as bitmap images) are analyzed and the curves identified using the defined curve pattern.

In one embodiment, the curve data 203 is provided to the motion capture system in the form of a "connectivity map," which is a text file representation of the curve pattern 201 which includes a list of all curves in the pattern and a list of all surface patches in the pattern, with each patch defined by its bounding curves. It is used by the camera controllers 205 and/or the central motion capture controller 206 to identify curves and intersections in the optically captured data. This, in turn, allows point data from the curves to be organized into surface patches and ultimately the triangulated mesh of a final 3-D geometry 207.

Figure 3:
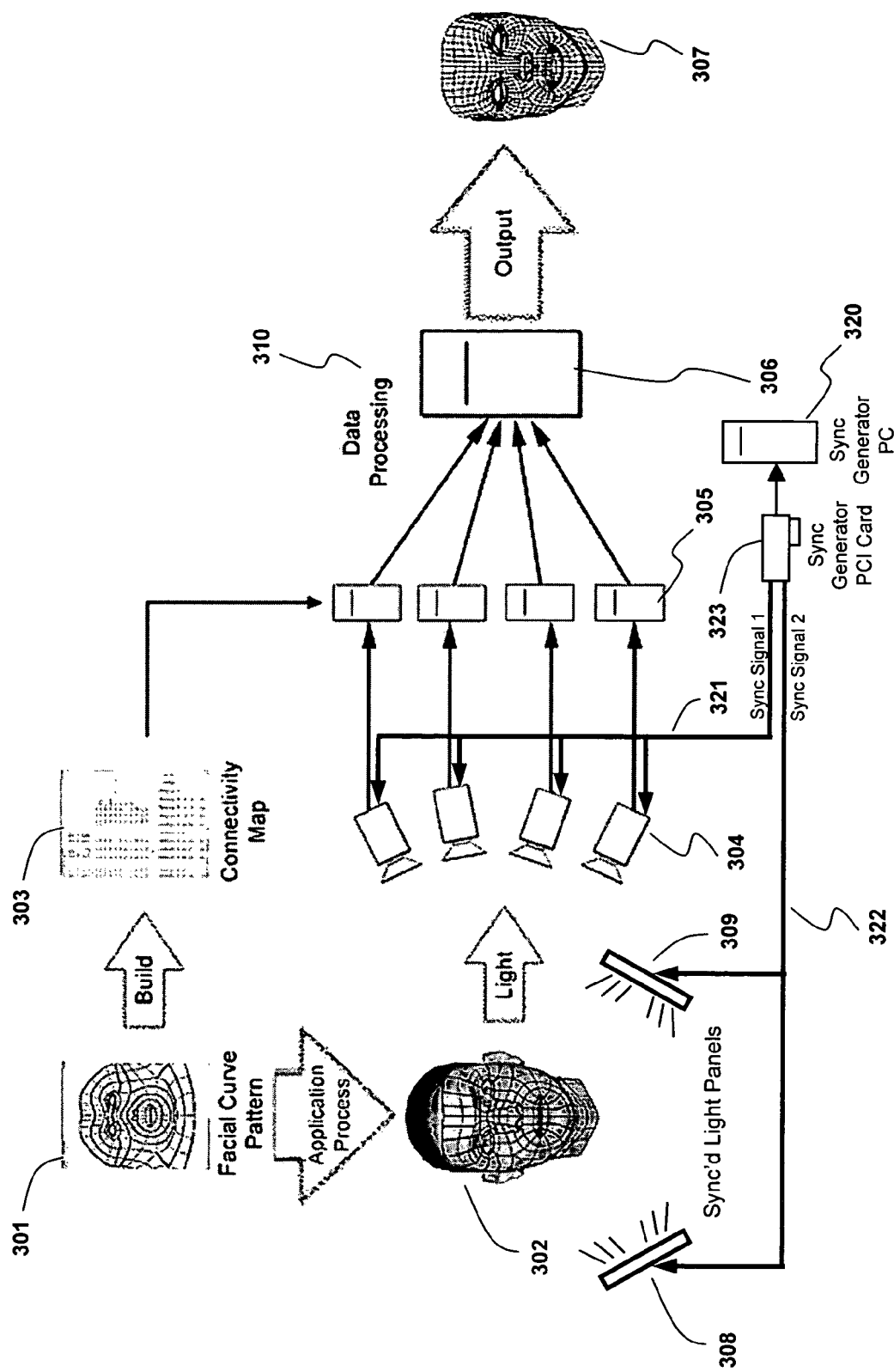
FIG. 3 illustrates one embodiment of the invention which synchronizes light panels and camera shutters.

In one embodiment of the invention, the efficiency of the motion capture system is improved by using phosphorescent paint and/or by precisely controlling synchronization between the cameras' shutters and the illumination of the painted curves. More specifically, referring to FIG. 3, in one embodiment of the invention, the predefined facial curve pattern 301 is painted on the performer's face 202 using phosphorescent paint. In addition, light panels 308-309 (e.g., LED arrays) are precisely synchronized with the opening and closing of the shutters of the motion capture cameras 304. In one embodiment, the synchronization between the light panels 308-309 and cameras 304 is controlled via synchronization signals 322 and 321, respectively. As indicated in FIG. 3, in one embodiment, the synchronization signals are provided from a peripheral component interface ("PCI") card 323 coupled to the PCI bus of a personal computer 320. An exemplary PCI card is a PCI-6601 manufactured by National Instruments of Austin, Tex. However, the underlying principles of the invention are not limited to any particular mechanism for generating the synchronization signals.

Figure 4:
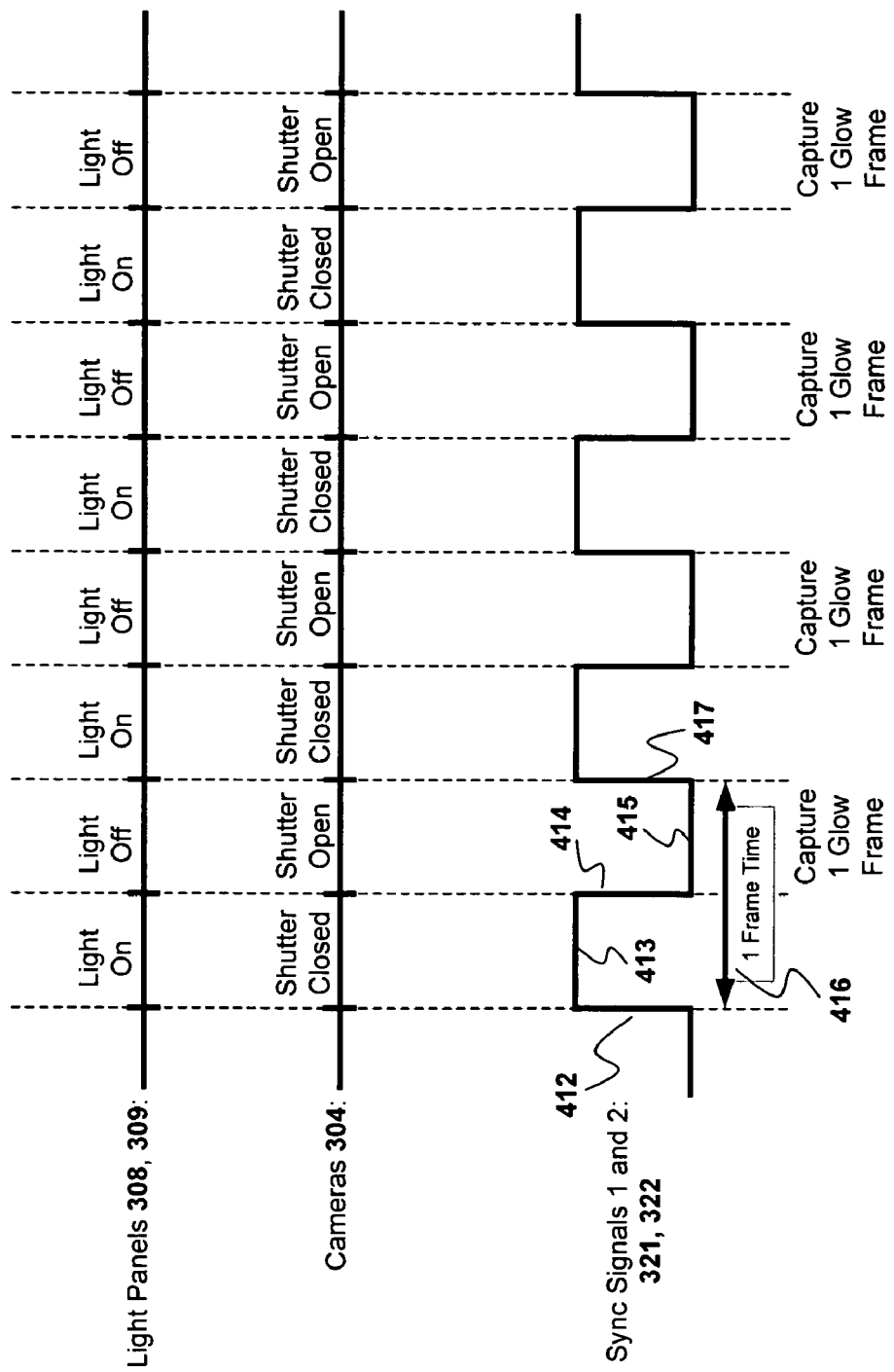
FIG. 4 is a timing diagram illustrating the synchronization between the light panels and the shutters according to one embodiment of the invention.

The synchronization between the light sources and the cameras employed in one embodiment of the invention is illustrated in FIG. 4. In this embodiment, the two synchronization signals 321, 322 are the same. In one embodiment, the synchronization signals cycle between 0 to 5 Volts. In response to the synchronization signals 321, 322, the shutters of the cameras are periodically opened and closed and the light panels are periodically turned off and on, respectively. For example, on the rising edge 412 of the synchronization signals, the camera shutters are closed and the light panels are illuminated. The shutters remain closed and the light panels remain illuminated for a period of time 413. Then, on the falling edge of the synchronization signals 414, the shutters are opened and the light panels are turned off. The shutters and light panels are left in this state for another period of time 415. The process then repeats on the rising edge 417 of the synchronization signals.

As a result, during the first period of time 413, no image is captured by the cameras, and the phosphorescent paint is illuminated with light from the light panels 308-309. During the second period of time 415, the light is turned off and the cameras capture an image of the glowing phosphorescent paint on the performer. Because the light panels are off during the second period of time 415, the contrast between the phosphorescent paint and the rest of the room is extremely high (i.e., the rest of the room is pitch black), thereby improving the ability of the system to differentiate the various curves painted on the performer's face. In addition, because the light panels are on half of the time, the performer will be able to see around the room during the performance. The frequency 416 of the synchronization signals may be set at such a high rate that the performer will not even notice that the light panels are being turned on and off. For example, at a flashing rate of 75 Hz or above, most humans are unable to perceive that a light is flashing and the light appears to be continuously illuminate. In psychophysical parlance, when a high frequency flashing light is perceived by humans to be continuously illuminated, it is said that "fusion" has been achieved. In one embodiment, the light panels are cycled at 120 Hz; in another embodiment, the light panels are cycled at 140 Hz, both frequencies far above the fusion threshold of any human. However, the underlying principles of the invention are not limited to any particular frequency.

Figure 6A:
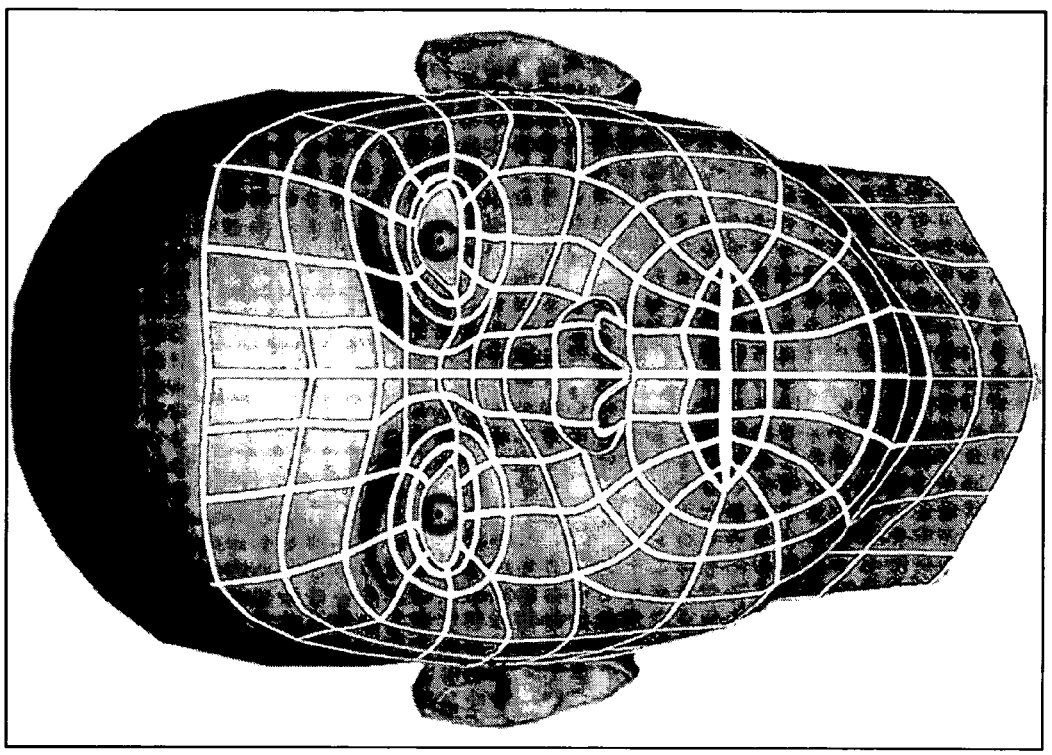
FIG. 6a illustrates a set of exemplary illuminated curves painted on a performer's face during a lit frame.
Figure 6B:
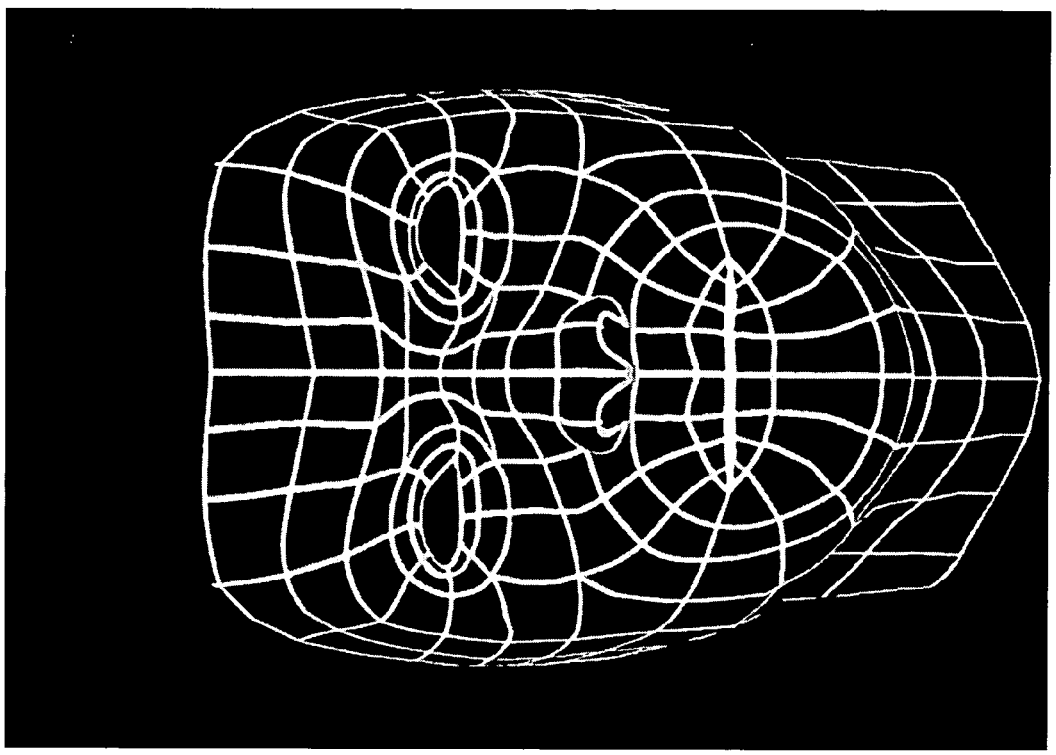
FIG. 6b illustrates a set of exemplary illuminated curves painted on a performer's face during a "glow" frame.

FIG. 6a is an exemplary picture of the performer during the first time period 413 (i.e., when the light panels are illuminated) and FIG. 6b shows the illuminated reflective curves captured by the cameras 304 during the second time period 415 (i.e., when the light panels are turned off). During the first time period, the phosphorescent paint is charged by the light from the light panels and, as illustrated in FIG. 6b, when the light panels are turned off, the only light captured by the cameras is the light emanating from the charged phosphorescent paint. Thus, the phosphorescent paint is constantly recharged by the strobing of the light panels, and therefore retains its glow throughout the motion capture session. In addition, because it retains its glow for a period of time, if a performer happens to move so that for a few frames some of the phosphorescent lines are in shadow and not illuminated by the light panels, even though the phosphorescent paint is not getting fully charged for those frames, the paint will still retain its glow from previous frame times (i.e., when the paint was not in shadow).

Figure 5:
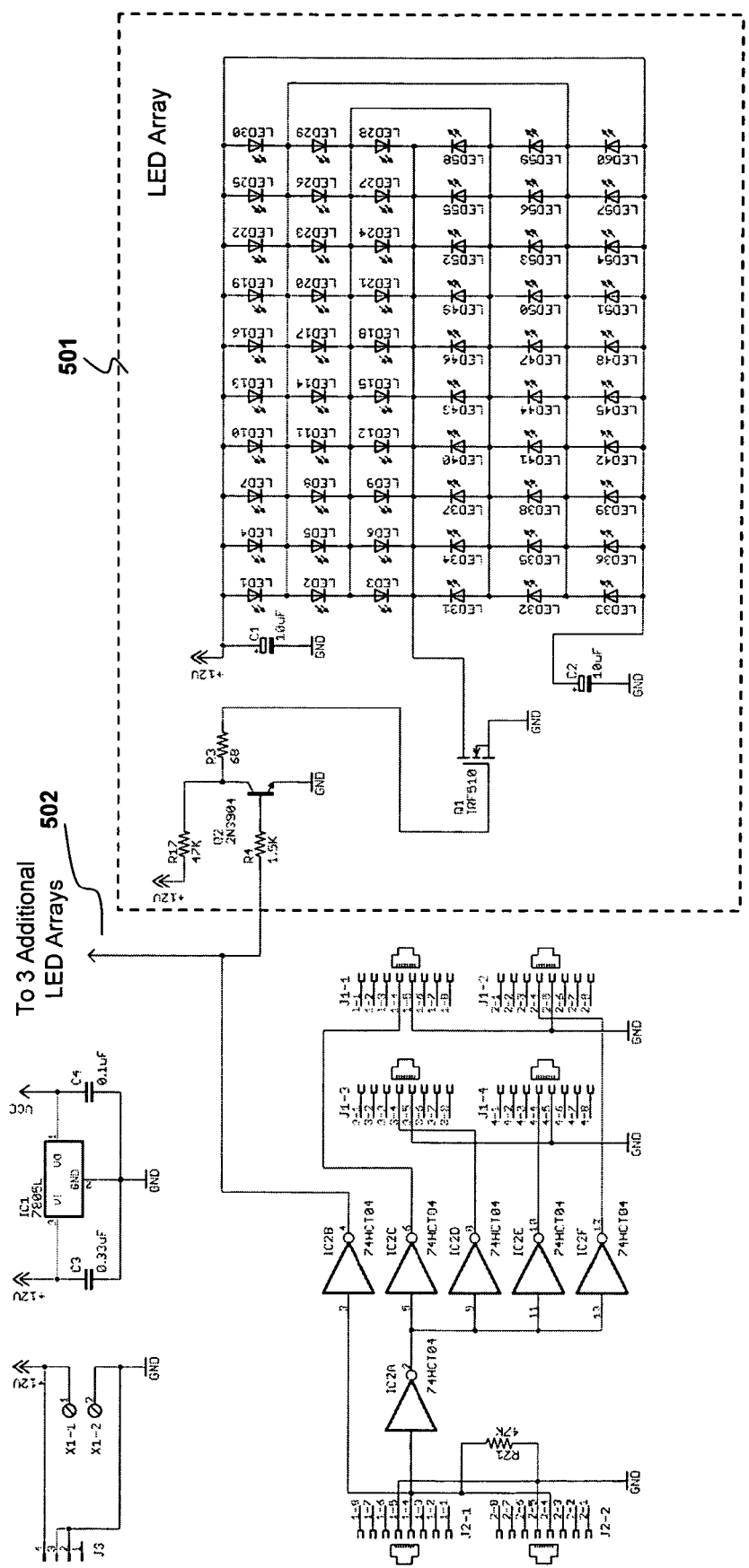
FIG. 5 is a schematic representation of an exemplary LED array and the connectors for the synchronization signals.

As mentioned above, in one embodiment, the light panels 308, 309 are LED arrays. A schematic of an exemplary LED array 501 and associated connection circuitry is illustrated in FIG. 5. The synchronization signals are applied to the LED array 501 via connector J2-1 illustrated to the left in FIG. 5. In one embodiment, the connectors are RJ-45 connectors. The synchronization signal is initially inverted by inverter IC2B and the inverted signal is applied to the base of transistor Q2, causing transistor Q2 to turn on and off in response to the inverted signal. This causes current to flow through resistor R3, thereby causing transistor Q1 to turn on and off. This, in turn, causes the LEDs within the LED array 501 to turn on and off. In one embodiment, the inverted signal from IC2B is applied to three additional LED arrays as indicated in FIG. 5. A plurality of additional connectors J1-1, J1-2, J1-3, and J1-4 are provided for additional light panels (i.e., the light panels may be daisy-chained together via these connectors) using inverters IC2C, IC2D, IC2E and IC2F for buffering. If daisy-chaining without buffering is desired (e.g. due to critical timing requirements that would be hampered by the IC2 propagation delays), then connector J2-2 can be used. The voltage regulaor IC1 used for the LED array (shown at the top of FIG. 5) takes a 12V input and produces a 5V regulated output used by IC2. In one embodiment, transistors Q1 is a MOSFET transistor. However, the underlying principles are not limited to any particular type of circuitry.

In one embodiment of the invention, the cameras are configured to capture pictures of the performer's face (e.g., FIG. 6a) in addition to capturing the phosphorescent curves (e.g., FIG. 6b). The pictures of the performer's face may then be used, for example, by animators as a texture map to interpolate between the curves and render and more accurate representation of the performer.

Figure 7:
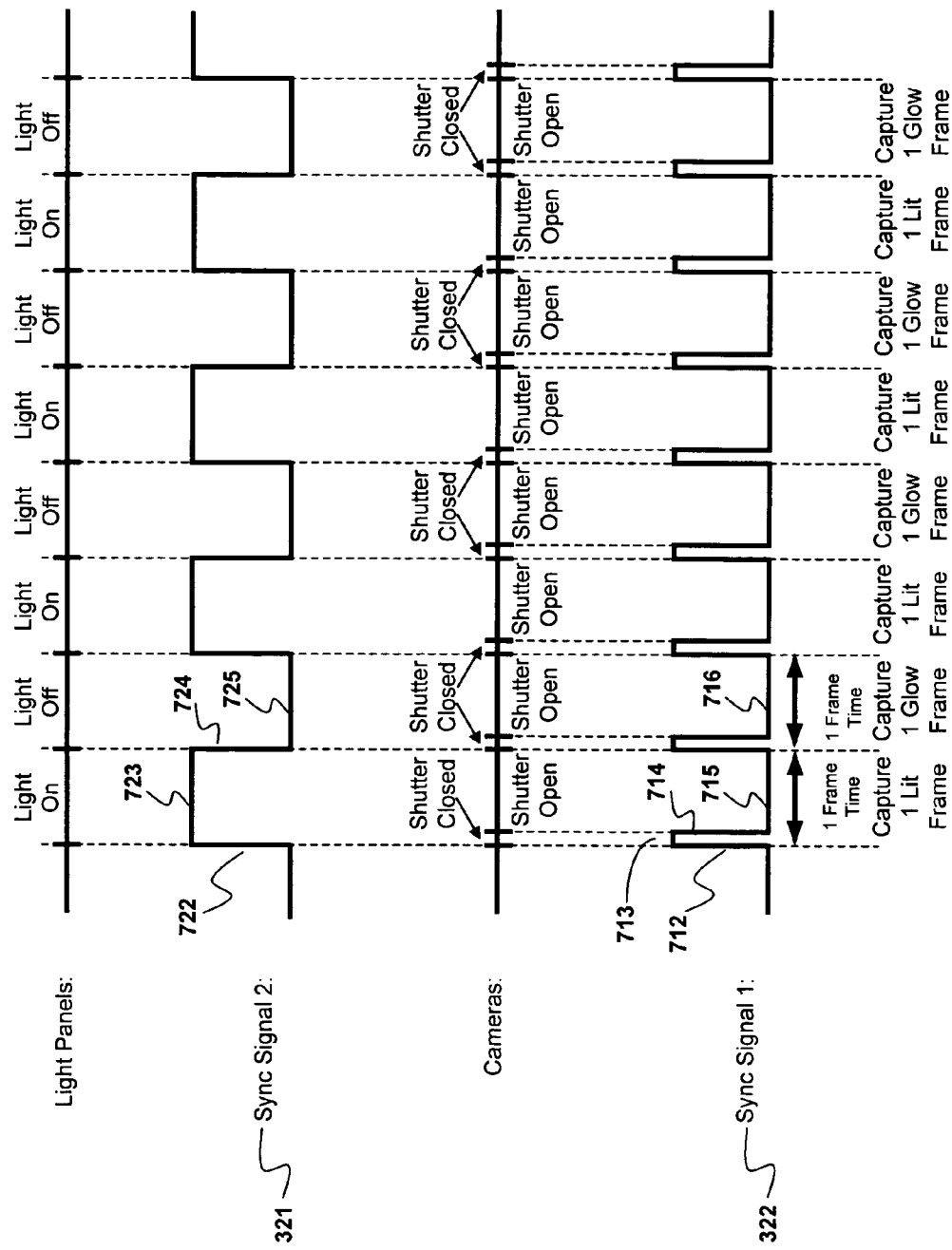
FIG. 7 is a timing diagram illustrating the synchronization between the light panels and the camera shutters in an embodiment for capturing both lit frames and glow frames.

The signal timing illustrated in FIG. 7 represents one such embodiment in which an asymmetric duty cycle is used for the synchronization signal for the cameras (in contrast to the 50% duty cycle shown in FIG. 4). In this embodiment, synchronization signal 2 remains the same as in FIG. 4. The rising edge 722 of synchronization signal 2 illuminates the light panels; the panels remain on for a first time period 723, turn off in response to the falling edge 724 of synchronization signal 2, and remain off for a second time period 725.

By contrast, synchronization signal 1, which is used to control the shutters, has an asymmetric duty cycle. In response to the rising edge 712 of synchronization signal 1, the shutters are closed. The shutters remain closed for a first period of time 713 and are then opened in response to the falling edge 714 of synchronization signal 1. The shutters remain open for a second period of time 715 and are again closed in response to the rising edge of synchronization signal 1. The signals are synchronized so that the rising edge of synchronization signal 1 always coincides with both the rising and the falling edges of synchronization signal 2. As a result, the cameras capture one lit frame during time period 715 (i.e., when the shutters are open the light panels are illuminated) and capture one "glow frame" during time period 716 (i.e., when the shutters are open and the light panels are off).

In one embodiment, the data processing system 310 shown in FIG. 3 separates the lit frames from the glow frames to generate two separate streams of image data, one containing the images of the performer's face and the other containing phosphorescent curve data. The glow frames may then be used to generate the mesh 307 of the performer's face and the lit frames may be used, for example, as a reference for animators (e.g., to interpolate between the curves) and/or as a texture map of the performer's face. The two separate video sequences may be synchronized and viewed next to one another on a computer or other type of image editing device.

Given the significant difference in overall illumination between the lit frames and the glow frames, some cameras may become overdriven during the lit frames if their light sensitivity is turned up very high to accommodate glow frames. Accordingly, in one embodiment of the invention, the sensitivity of the cameras is cycled between lit frames and glow frames. That is, the sensitivity is set to a relatively high level for the glow frames and is then changed to a relatively low level for the lit frames.

Figure 8:
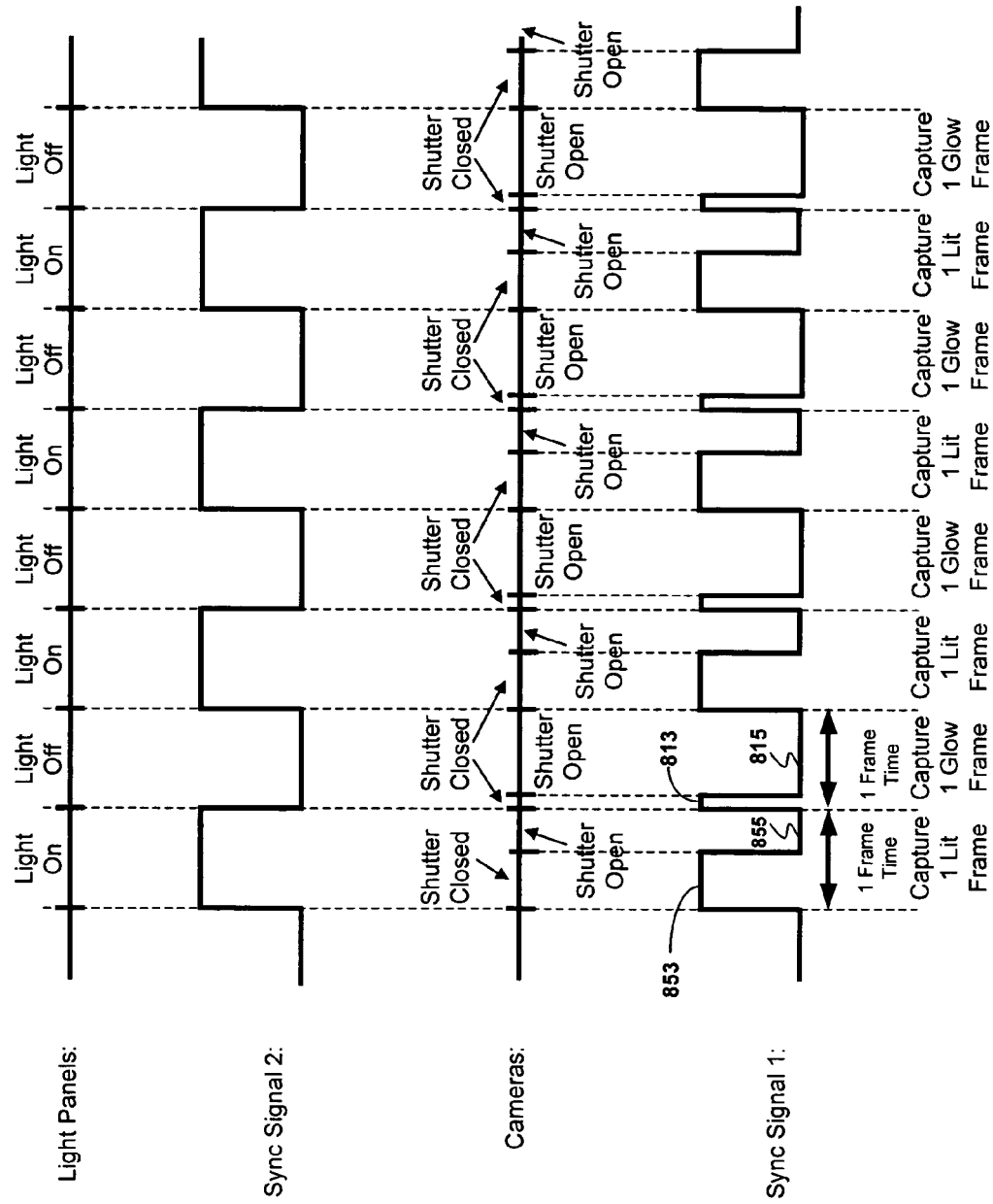
FIG. 8 is a timing diagram illustrating the synchronization between the light panels and the camera shutters in another embodiment for capturing both lit frames and glow frames.

Alternatively, if the sensitivity of the cameras 304 cannot be changed on a frame-by-frame basis, one embodiment of the invention changes the amount of time that the shutters are open between the lit frames and the glow frames. FIG. 8 illustrates the timing of one such embodiment in which synchronization signal 1 is adjusted to ensure that the cameras will not be overdriven by the lit frames. Specifically, in this embodiment, during the period of time that synchronization signal 2 is causing the light panels to be illuminated, synchronization signal 1 causes the shutter to be closed for a relatively longer period of time than when synchronization signal 2 is not illuminating the light panels. In FIG. 8, for example, synchronization signal 1 is high during time period 853, thereby closing the shutter, and is low during period 855, thereby opening the shutter. By contrast, during the glow frame, synchronization signal 1 is high for a relatively short period of time 813 and is low for a relatively longer period of time 815.

Figure 9:
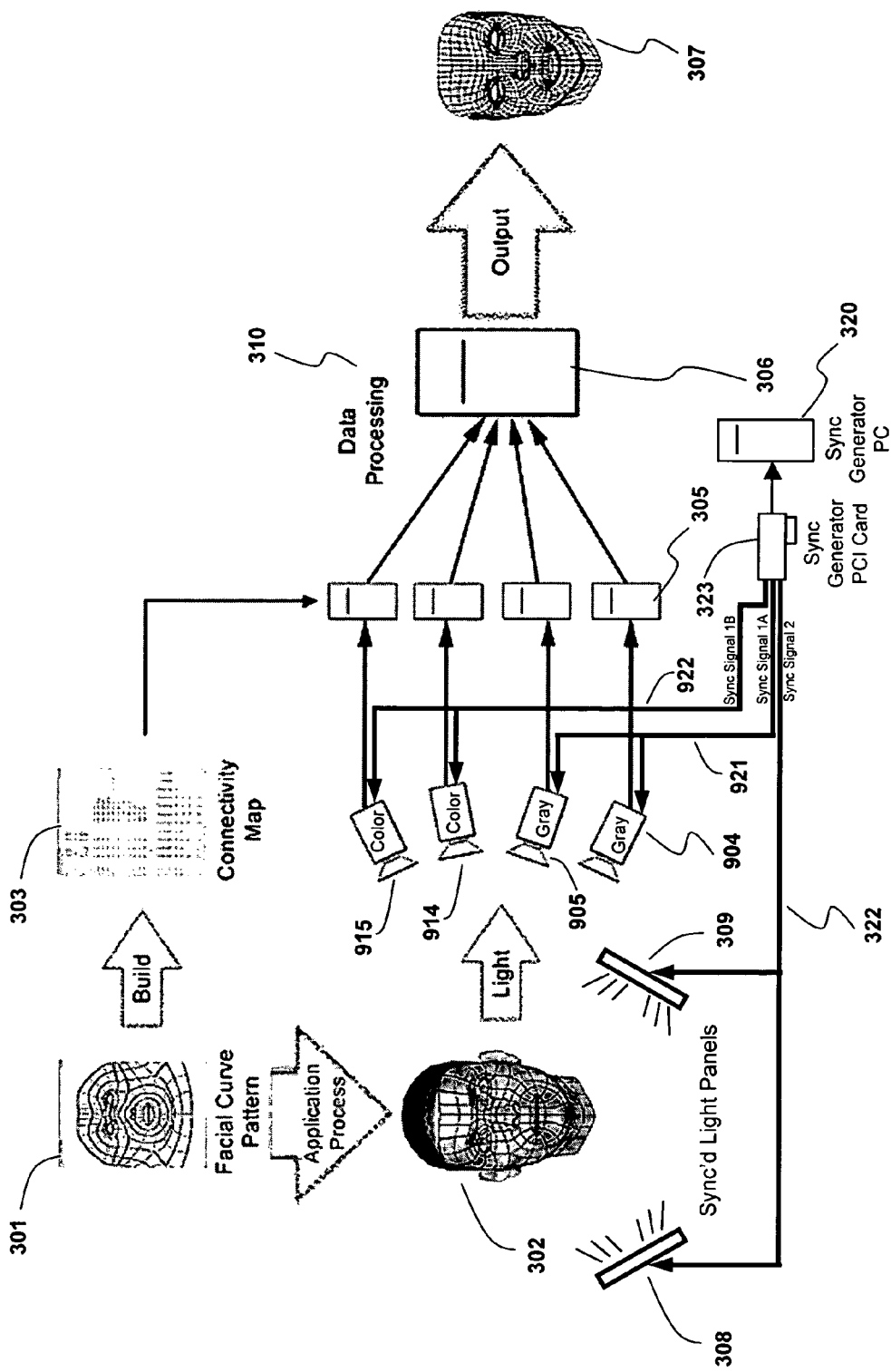
FIG. 9 illustrates one embodiment of a system for capturing both lit frames and glow frames.

In one embodiment, illustrated in FIG. 9, both color and grayscale cameras are used and are synchronized using different synchronization signals. Specifically, in this embodiment, color cameras 914-915 are used to capture the lit frames and grayscale cameras 904-905 are used to capture the phosphorescent curves painted on the performer's face. One of the benefits of this configuration is that grayscale cameras typically have a relatively higher resolution and higher light sensitivity than comparable sensor resolution color cameras, and can therefore capture the phosphorescent curves more precisely. By contrast, color cameras are more well suited to capturing the color and texture of the performer's face. In addition, grayscale cameras may be adjusted to a relatively higher sensitivity than the color cameras.

Figure 10:
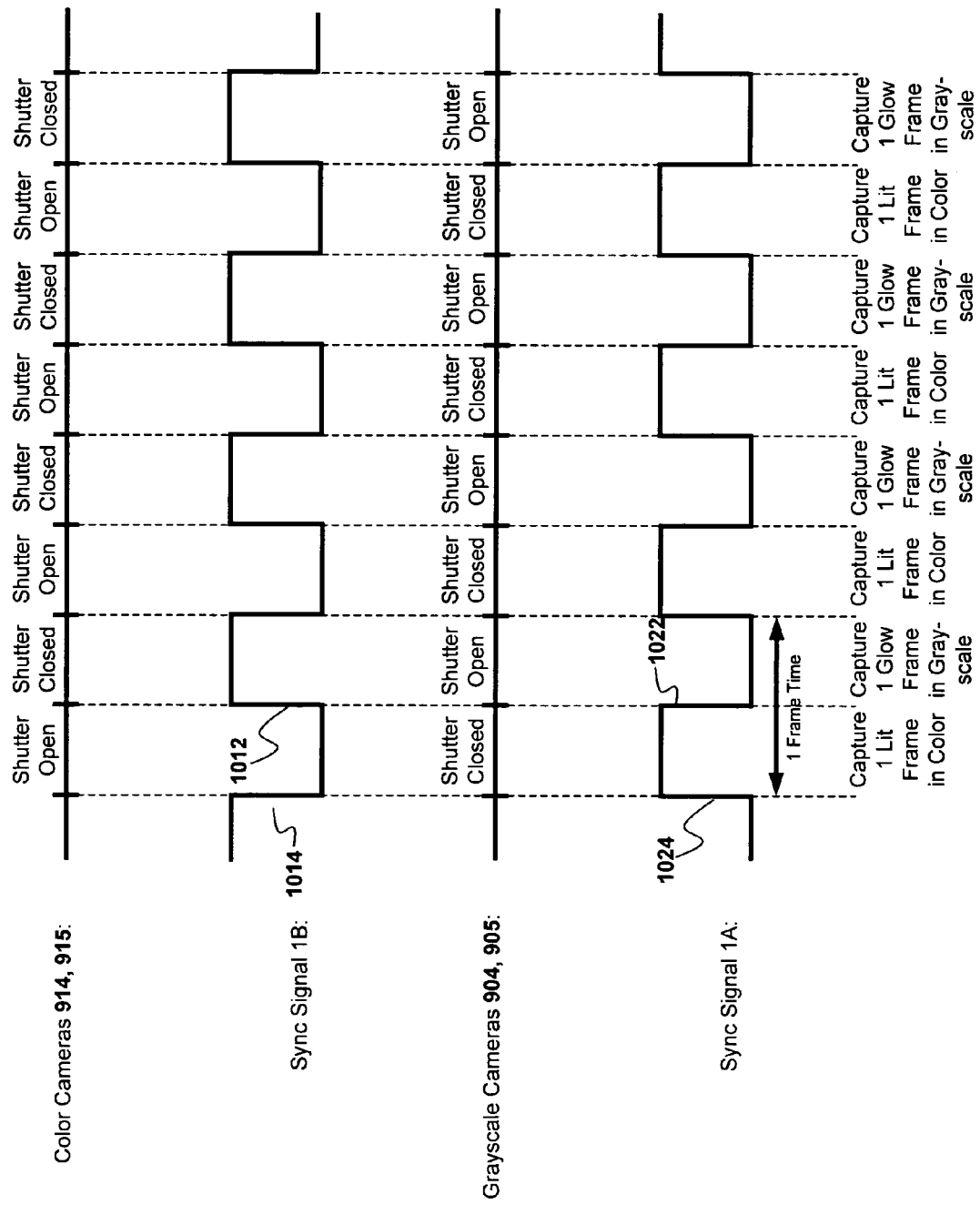
FIG. 10 illustrates a timing diagram associated with the system shown in FIG. 9.

As illustrated in FIG. 10, in one embodiment, different synchronization signals, 1A and 1B are used to control the grayscale and color cameras, respectively. In FIG. 10, synchronization signals 1A and 1B are 180 degrees out of phase. As a result, the falling edge 1014 of synchronization signal 1B occurs at the same time as the rising edge 1024 of synchronization signal 1A, thereby opening the shutters for the color cameras 914, 915 and closing the shutters for the grayscale cameras 904, 905. Similarly, the falling edge 1012 of synchronization signal 1B occurs at the same time as the falling edge 1022 of synchronization signal 1A, thereby closing the shutters for the color cameras 914, 915 and opening the shutters for the grayscale cameras 904, 905. The synchronization signal 2 for the light panels is not illustrated in FIG. 10 but, in one embodiment, is the same as it is in FIG. 4, turning the light panels on when the color camera shutters are opened and turning the light panels off when the grayscale camera shutters are opened.

When the embodiments of the present invention described herein are implemented in the real world, the synchronization signals (e.g., 321 and 322 of FIG. 3) may require slight delays between respective edges to accommodate delays in the cameras and LED arrays. For example, on some video cameras, there is a slight delay after rising edge 412 of FIG. 4 before the camera shutter closes. This can be easily accommodated by delaying signal 322 relative to signal 321. Such delays are typically on the order of less than a millisecond. As such, when the system is started, the timing signals may initially need to be precisely calibrated by observing whether the video cameras 304 are capturing completely black frames and adjusting the timing signals 321 and 322 prior to the actual performance.

Although the embodiments described above describe the use of a series of curves painted on the face of a performer, the underlying principles of the invention are not limited to this implementation. For example, instead of curves, one embodiment of the invention uses markers dipped in phosphorescent paint to capture the skeletal motion of the performer using the shutter and light panel synchronization techniques described above (either in lieu of or in addition to the curves on the performer's face, and either in lieu of or in addition to retroreflective markers). Moreover, curves may also be painted on the body and/or clothing of the performer while still complying with the underlying principles of the invention.

In one embodiment, the phosphorescent paint applied to the performer's face is Fantasy F/XT Tube Makeup; Product #: FFX; Color Designation: GL; manufactured by Mehron Inc. of 100 Red Schoolhouse Rd. Chestnut Ridge, N.Y. 10977. In addition, in one embodiment, Basler A311f cameras 304 are used to capture the images of the performer. However, the underlying principles of the invention are not limited to any particular type of phosphorescent paint or camera.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A method comprising:
    applying phosphorescent paint to regions of a performer's face and/or body;
    strobing a light source on and off, the light source charging the phosphorescent paint when on; and
    strobing the shutters of a first plurality of cameras synchronously with the strobing of the light source to capture sequences of images of the phosphorescent paint ("glow frames") as the performer moves or changes facial expressions during a performance, wherein the shutters are open when the light source is off and the shutters are closed when the light source is on.

2. The method as in claim 1 further comprising:
    tracking the motion of the phosphorescent paint over time; and
    generating motion data representing the movement of the performer's face and/or body using the tracked movement of the phosphorescent paint.

3. The method as in claim 1 wherein the phosphorescent paint is applied as a series of curves on the performer's face.

4. The method as in claim 1 wherein the phosphorescent paint is applied as a series of markers at specified areas of the performer's body.

5. The method as in claim 1 further comprising:
    strobing the shutters of a second plurality of cameras synchronously with the strobing of the light source to capture images of the performer ("lit frames"), wherein the shutters of the second plurality of cameras are open when the light source is on and the shutters of the second plurality of cameras are closed when the light source is off.

6. The method as in claim 5 wherein the first plurality of cameras are grayscale cameras and the second plurality of cameras are color cameras.

7. The method as in claim 5 further comprising:
    separating the lit frames from the glow frames to generate two separate sets of image data.

8. The method as in claim 5 wherein cameras capturing the lit frames have a sensitivity which is different from cameras capturing the glow frames.

9. The method as in claim 5 further comprising:
    opening the shutters for a first period of time when the light source is on; and
    opening the shutters for a second period of time when the light source is off;
    wherein the first and second periods of time are unequal.

10. The method as in claim 5 wherein color cameras are used to capture the lit frames and grayscale cameras are used to capture the glow frames.

11. The method as in claim 10 wherein the grayscale cameras have a relatively higher sensitivity than the color cameras.

12. The method as in claim 10 wherein two different synchronization signals are used to control the shutters of the color and grayscale cameras.

13. The method as in claim 12 wherein the different synchronization signals are 180 degrees out of phase.

14. The method as in claim 1 wherein the light source comprises a light emitting diode (LED) array.

15. The method as in claim 1 wherein strobing the shutters comprises opening the shutters for a first period of time and closing the shutters for a second period of time, the second period of time being of a different duration than the first period of time.

16. The method as in claim 15 wherein the first period of time is longer than the second period of time.

17. The method as in claim 1 wherein the camera shutters are controlled by synchronization signals from a computer system.

18. The method as in claim 1 wherein strobing the shutters further comprises:
opening the shutters for a period of time when the light source is on to capture images of the performer's face and/or body.

19. The method as in claim 18 wherein after being opened to capture a lit frame, the shutters are closed and then opened again when the light source is off to capture the next glow frame, and then closed and then opened again when the light source is on to capture the next lit frame.

20. The method as in claim 18 wherein strobing the shutters comprises opening the shutters for a first period of time and closing the shutters for a second period of time wherein the first period of time is not equal to the second period of time.

21. The method as in claim 20 further comprising:
opening the shutters for a relatively shorter period of time when the light source is on; and
opening the shutters for a relatively longer period of time when the light source is off.

22. The method as in claim 18 further comprising:
separating the lit frames from the glow frames to generate two separate sets of image data.

23. The method as in claim 18 further comprising:
alternating sensitivity, of the cameras between capturing the lit frames and the glow frames.

24. A system comprising:
a synchronization signal generator to generate one or more synchronization signals;
a light source configured to strobe on and off responsive to a first one of the one or more synchronization signals, the light source charging phosphorescent paint applied to regions of a performer's face and/or body for a motion capture session; and
a plurality of cameras having shutters strobed synchronously with the strobing of the light source to capture sequences of images of the phosphorescent paint ("glow frames") as the performer moves or changes facial expressions during a performance, wherein the shutters are open when the light source is off and the shutters are closed when the light source is on.

25. The system as in claim 24 further comprising:
an image processing device generating motion data representing the movement of the performer's face and/or body using the tracked movement of the phosphorescent paint.

26. The system as in claim 24 wherein the phosphorescent paint is applied as a series of curves on the performer's face.

27. The system as in claim 24 wherein the phosphorescent paint is applied as a series of markers at specified areas of the performer's body.

28. The system as in claim 24 further comprising:
a second plurality of cameras having shutters strobed synchronously with the strobing of the light source to capture images of the performer ("lit frames"), wherein the shutters of the second plurality of cameras are open when the light source is on and the shutters of the second plurality of cameras are closed when the light source is off.

29. The system as in claim 28 further comprising an image processing device separating the lit frames from the glow frames to generate two separate sets of image data.

30. The system as in claim 28 wherein cameras capturing the lit frames have a sensitivity which is different from cameras capturing the glow frames.

31. The system as in claim 28 wherein at least some of the plurality of cameras are controlled to open the shutters for a relatively shorter period of time when the light source is on; and open the shutters for a relatively longer period of time when the light source is off.

32. The system as in claim 28 wherein color cameras are used to capture the lit frames and grayscale cameras are used to capture the glow frames.

33. The system as in claim 28 wherein the first plurality of cameras are grayscale cameras and the second plurality of cameras are color cameras.

34. The system as in claim 33 wherein the grayscale cameras have a relatively higher sensitivity than the color cameras.

35. The system as in claim 33 wherein two different synchronization signals are used to control the shutters of the color and grayscale cameras.

36. The system as in claim 35 wherein the different synchronization signals are 180 degrees out of phase.

37. The system as in claim 24 wherein the light source comprises a light emitting diode (LED) array comprising at least one LED.

38. The system as in claim 24 wherein strobing the shutters comprises opening the shutters for a first period of time and closing the shutters for a second period of time, the second period of time being of a different duration than the first period of time.

39. The system as in claim 38 wherein the first period of time is longer than the second period of time.

40. The system as in claim 24 wherein the camera shutters are controlled by synchronization signals from a computer system.

41. The system as in claim 24 wherein strobing the shutters further comprises:
opening the shutters for a period of time when the light source is on to capture images of the performer's face and/or body.

42. The system as in claim 41 wherein after being opened to capture a lit frame, the shutters are closed and then opened again when the light source is off to capture the next glow frame, and then closed and then opened again when the light source is on to capture the next lit frame.

43. The system as in claim 42 wherein the image processing device separates the lit frames from the glow frames to generate two separate sets of image data.

44. The system as in claim 41 wherein strobing the shutters comprises opening the shutters for a first period of time and closing the shutters for a second period of time, wherein the first period of time is not equal to the second period of time.

45. The system as in claim 44 wherein the shutters are opened for a relatively shorter period of time when the light source is on; and
wherein the shutters are opened for a relatively longer period of time when the light source is off.

46. The system as in claim 41 wherein sensitivity of the cameras is alternated between capturing the lit frames and the glow frames.

47. A method comprising:
applying phosphorescent paint to regions of a face and/or body or a performer;

strobing a light source on and off, the light source charging the phosphorescent paint when on; and strobing the shutters of a plurality of cameras synchronously with the strobing of the light source to capture a sequence of images of the phosphorescent paint ("glow frames) and images of the object in motion ("lit frames"), wherein the shutters are closed and then opened when the light source is off to capture the glow frames and then closed and then opened when the light source is on to capture the lit frames.

48. The method as in claim 47 further comprising:

tracking the motion of the phosphorescent paint over time; and generating motion data representing the movement of the object using the tracked movement of the phosphorescent paint.

49. The method as in claim 47 wherein strobing the shutters comprises opening the shutters for a first period of time and closing the shutters for a second period of time wherein the first period of time is not equal to the second period of time.

50. The method as in claim 49 further comprising:

opening the shutters for a relatively shorter period of time when the light source is on; and opening the shutters for a relatively longer period of time when the light source is off.

51. The method as in claim 47 further comprising:

separating the lit frames from the glow frames to generate two separate sets of image data.

52. The method as in claim 47 further comprising:

alternating sensitivity of the cameras between capturing the lit frames and the glow frames.

* * * * *